June 6, 1967 W. P. KISTLER ET AL 3,323,372
LINEAR SERVO-ACCELEROMETER
Original Filed Sept. 21, 1961 4 Sheets-Sheet 1

INVENTORS
Walter P. Kistler
Vernon H. Siegel

BY  LeBlanc & Shur

ATTORNEY

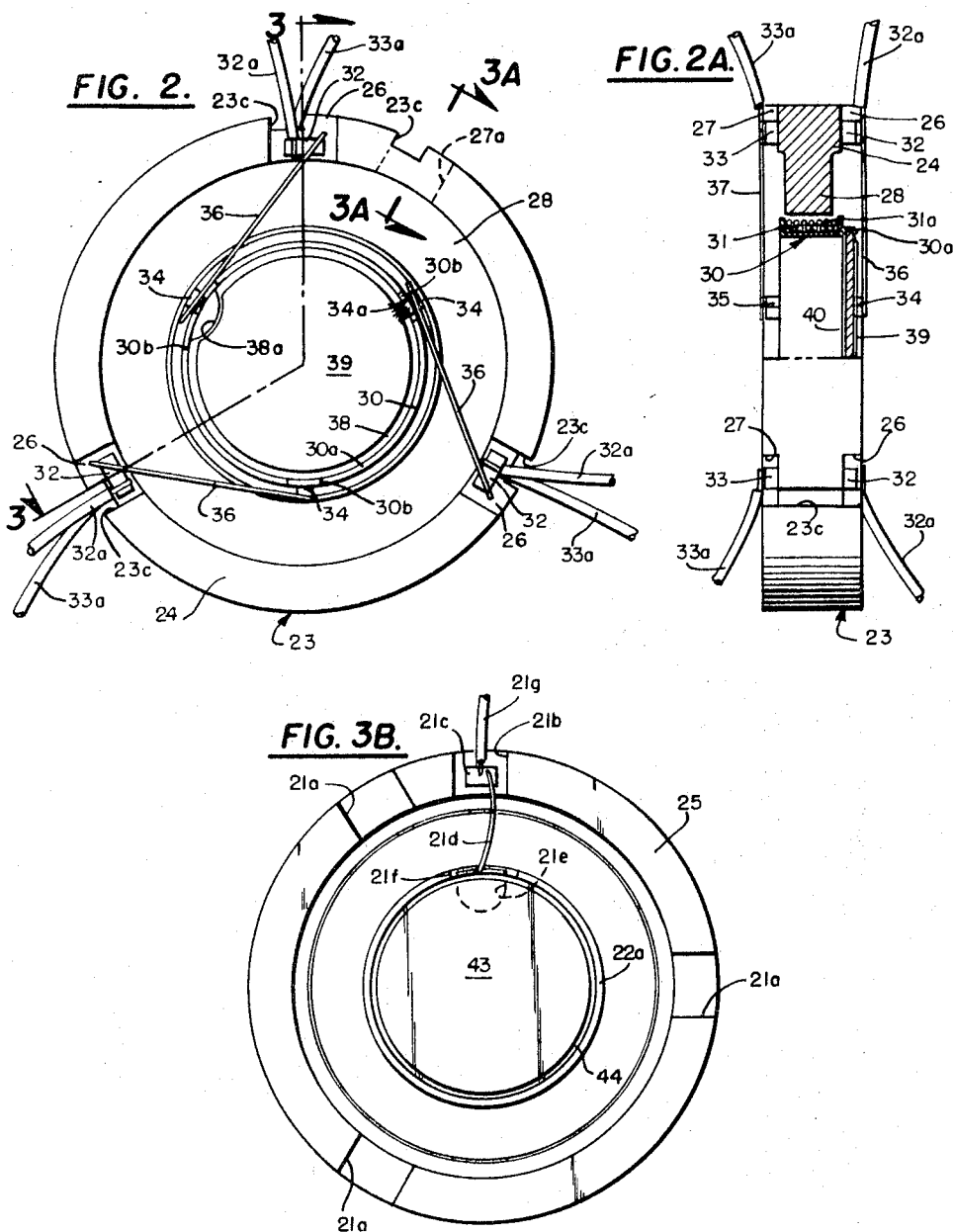

June 6, 1967 W. P. KISTLER ETAL 3,323,372
LINEAR SERVO-ACCELEROMETER
Original Filed Sept. 21, 1961 4 Sheets-Sheet 3

INVENTORS
Walter P. Kistler
Vernon H. Siegel

BY  Le Blanc & Shur

ATTORNEY

June 6, 1967 W. P. KISTLER ETAL 3,323,372
LINEAR SERVO-ACCELEROMETER
Original Filed Sept. 21, 1961 4 Sheets-Sheet 4

INVENTORS
Walter P. Kistler
Vernon H. Siegel

BY LeBlanc & Shur

ATTORNEY

United States Patent Office 3,323,372
Patented June 6, 1967

3,323,372
LINEAR SERVO-ACCELEROMETER
Walter P. Kistler and Vernon H. Siegel, Clarence, N.Y., assignors to Kistler Instrument Corporation, Clarence, N.Y., a corporation of New York
Continuation of application Ser. No. 139,666, Sept. 21, 1961. This application Oct. 18, 1965, Ser. No. 497,377
20 Claims. (Cl. 73—517)

This application is a continuation of copending application Ser. No. 139,666, filed Sept. 21, 1961, now abandoned.

The present invention relates to a new improved linear response force balance or servo type accelerometer in which the force from an acceleration, applied to a seismic or inertial element, is counter-balanced by an electromagnetic force generated by a current flowing in a servo loop and energizing a movable coil in a magnetic field, with an improved capacitance pick-off arrangement of great sensitivity and increased range. This invention is also concerned with an improved miniaturized accelerometer of the type described in which all associated electronic circuitry utilized to operate the servo loop is located in the same casing with the mechanical parts of the accelerometer, thus providing a complete instrument in a single housing, which instrument is of smaller size, greater ruggedness, and higher accuracy than has been possible heretofore in instruments of comparable relatively moderate cost by reason of various mechanical and electrical features to be described.

Various accelerometers have been suggested heretofore; and in general, such accelerometers include a test or inertial mass, or seismic element, arranged to respond to the resultant of acceleration and gravitational forces acting thereon, and to be moved by such resultant forces in a particular direction. Such movement may be monitored by appropriate electrical circuitry to give an indication of the forces thus imposed upon said test mass.

One general type of accelerometer operating in this manner, with which the present invention is primarily concerned, is the so-called servo accelerometer, in which the inertial test mass normally includes an electrical coil disposed in a magnetic field, and arranged to move relative to such magnetic field. Movement of the test mass upon the imposition of resultant forces in the direction of permissible movement is utilized to produce a control signal which acts as an output signal from the system indicating the amount of movement and accordingly the resultant force thus imposed on the mass. The signal thus produced is further utilized to generate a current which is in turn fed back to the electrical coil comprising a portion of the inertial mass (normally termed the "forcer" coil) thereby effecting a restoring force for returning said test mass to a predetermined zero position relative to its associated magnetic field.

Certain previously known serve accelerometers operating in the general manner described take the form of instruments containing, in a unitary structure, both mechanical parts responding to resultant forces and electrical circuits providing an output signal and restoring force, as mentioned. However, such prior self-contained instruments have lacked the features of compactness and ruggedness which are highly desirable in many accelerometer applications. In particular, such prior self-contained accelerometers have generally employed an unbalanced meter movement suspended in jewel pivots as the seismic element; and the system has accordingly been extremely delicate and very sensitive to vibration. Furthermore, by reason of the arrangement thus employed, these prior systems have exhibited hysteresis caused by friction in the pivots, and this has inherently limited the resolution and accuracy of the accelerometer. Such disadvantages have been further complicated by so-called cross-coupling effects arising from the form of suspension normally employed, resulting in the fact that the seismic element of the accelerometer tends to rotate at least partially about a shaft or axis of rotation instead of moving along a straight line.

Various other high precision servo accelerometers have been suggested in an effort to overcome some of the mentioned disadvantages of prior types discussed above. However, these high precision accelerometers have generally been quite large and very expensive instruments; and have further required additional "black boxes" containing elaborate electronic circuitry needed to operate the servo loop, and to provide the relatively large D.C. current necessary to constrain the seismic element and restore it to its desired zero position. In many instances, the external circuitry thus provided has further necessitated numerous lead wires carrying low level high frequency signals, and has also required the use of slip rings for signal coupling purposes, which features have been found to introduce major difficulties in installation, maintenance, and continued proper operation of the accelerometer system. Moreover, such prior high precision accelerometers often employ high quality suspension systems, e.g., fluid flotation or air bearings, in order to be free of hysteresis and tend to guide the seismic element along a well defined straight axis. But, such suspension systems have necessarily involved large and expensive arrangements, and have also required provision of auxiliary supplies of compressed air, accurate temperature control equipment, etc., all of which severely limit the uses to which the resultant instrument may be put.

In an effort to simplify servo accelerometers, and to decrease the cost thereof, still other designs have been proposed, as, for example, mounting of the seismic element by suspending its opposed ends respectively by a plurality of radially strung wires; e.g., three such radial wires at each end of the seismic element. Such a suspension gives relatively good radial constrainment but allows insufficient axial freedom of movement; and as a result such systems exhibit poor null stability as well as temperature drift. Furthermore, such arrangements have employed an elongated central shaft as the seismic element whereby it is relatively heavy, thus causing the over-all instrument to have low natural frequency and to exhibit poor behavior under vibrations. Hence, this prior type accelerometer has not been successful.

In addition, the last-mentioned and other above-described accelerometers have employed a double forcer coil and twin magnet arrangement, which was considered necessary to avoid an unlinear response of the accelerometer, due to the normally unsymmetrical axis field distribution present in the air gap of a single magnet. The use of such double forcer coils and twin magnet arrangements, however, tends to defeat the desired simplicity of accelerometer design, and increases the size and weight of the instrument, and complicates the assembly thereof.

Recognizing these characteristics of prior servo accelerometers, the present invention is concerned with a novel improved accelerometer construction which avoids the various disadvantages exhibited by servo accelerometers available heretofore and achieves important improvements in manufacture, installation and performance.

It is accordingly an object of the present invention to provide a new improved accelerometer of small size and relatively moderate price which is compact and rugged in structure, and which is highly accurate in operation.

It is a further object of the present invention to provide an improved accelerometer of the servo type having a high natural frequency, with a minimum of electrical connections, requiring little power to operate, and generating a large output signal.

Still another object of the present invention resides in the provision of a servo accelerometer employing a highly improved magnet assembly; a novel seismic element; and a unique non-pendulous flexure arm suspension supporting and guiding the seismic element of the instrument and eliminating sensitivity to angular and cross axis accelerations as well as minimizing zero shift. It is a related object to provide such an accelerometer with a compact highly sensitive capacitive pick-off associated with the seismic mass. It is still another object to provide an improved seismic element suspension and associated signal pickup means, wherein electronic circuit components are electrically connected to electric components of the seismic and pickup element through the flexure supporting arms for the seismic element.

It is another object to provide an improved accelerometer in which the seismic element consists of a light-weight ring-shaped frame or spool supporting a forcer coil thereon, and located inside the circular air gap of a single-ended magnet assembly including a strong permanent magnet, thereby eliminating the previously-mentioned disadvantages inherent in twin magnet double forcer coil and related arrangements typically employed heretofore. It is a related object to take advantage of a single magnet arrangement by carefully assuring that under high acceleration loads, the displacement of the forcer coil in the magnetic gap is so small that the magnetic coupling between the coil and its associated magnet remains substantially constant. It is another object, by elimination of the twin magnet configuration normally utilized heretofore to substantially simplify the accelerometer design, making for easier assembly, and facilitating the reduction in size and weight of the instrument which characterizes this invention. A still further object of the present invention is to provide an improved miniaturized integrated linear accelerometer having both seismic mechanical and closed loop force balance electrical and electronic portions of the instrument disposed within a single sealed housing, while providing a self-contained complete instrument of smaller size than has been possible heretofore (in the order of one inch diameter and two inches long, and even smaller).

It is another object to provide a new improved seismic element, comprising a small light-weight ring-shaped frame bearing a forcer coil which is held in the instrument's magnetic field by a novel suspension comprising a plurality of wires tangentially connected to each end of the frame so as to allow an axial inertial displacement without radial motion and eliminating various disadvantages exhibited by radial wire suspensions suggested heretofore while achieving with a relatively simple and small arrangement a high performance seismic suspension comparable to that obtained previously only with air bearings or flotation in large, expensive, high precision accelerometers. It is a related object to provide an improved accelerometer in which one end of the light-weight ring-shaped seismic element is also associated with an improved differential capacitive pick-off or displacement detector, with one end of said seismic frame supporting a flat metallized plate located between a pair of fixed metallized plates and the capacitive gaps between these plates being extremely small (in the order of $1/1,000$ of an inch) so that the sensitivity of the pick-off is extremely high. It is another related object to provide such an accelerometer in which signals generated by said capacitive pick-off are interpreted by an ultra-stable passive electronic circuit adapted to provide a high level signal output while simultaneously providing the necessary restoring force to the inertial test mass. It is another related object to provide such an accelerometer using improved force balance techniques whereby a seismic element displacement of $1/100,000$ of an inch is actually sufficient to generate a signal equivalent to one $g$. It is another related object to provide such an improved stable, accurate accelerometer having a range of up to $\pm 100$ g.

A still further object of the present invention resides in the provision of a self-contained servo accelerometer employing a much simplified but high precision electronic circuit, where the servo loop consists of passive components only, and adapted to provide an output signal from the instrument which may be connected directly to telemetering equipment, recorders, integrators, or other circuitry, without the need for additional amplification, demodulation, or impedance matching.

Still another object of the present invention resides in the provision of an improved accelerometer adapted, with slight modification, to be employed as an acceleration integrator to give a velocity indication. It is another related object to provide such an improved accelerometer and velocity indicator which, with slight modification, can be employed as a velocity integrator to give a displacement indication.

The foregoing and other objects and advantages of the present invention, and its construction and operation, will become more readily apparent from the following description and accompanying drawings, in which:

FIGURE 2 is a cross-sectional view taken along line 2—2 of FIGURE 1;

FIGURE 2A is a side elevation, with partial vertical cross-section, showing the seismic mass suspension and moving capacitor sub-assembly incorporated in the accelerometer of FIGURE 1;

FIGURE 3B is an end elevation view of the magnet sub-assembly shown in FIGURE 3A;

Figure 1:
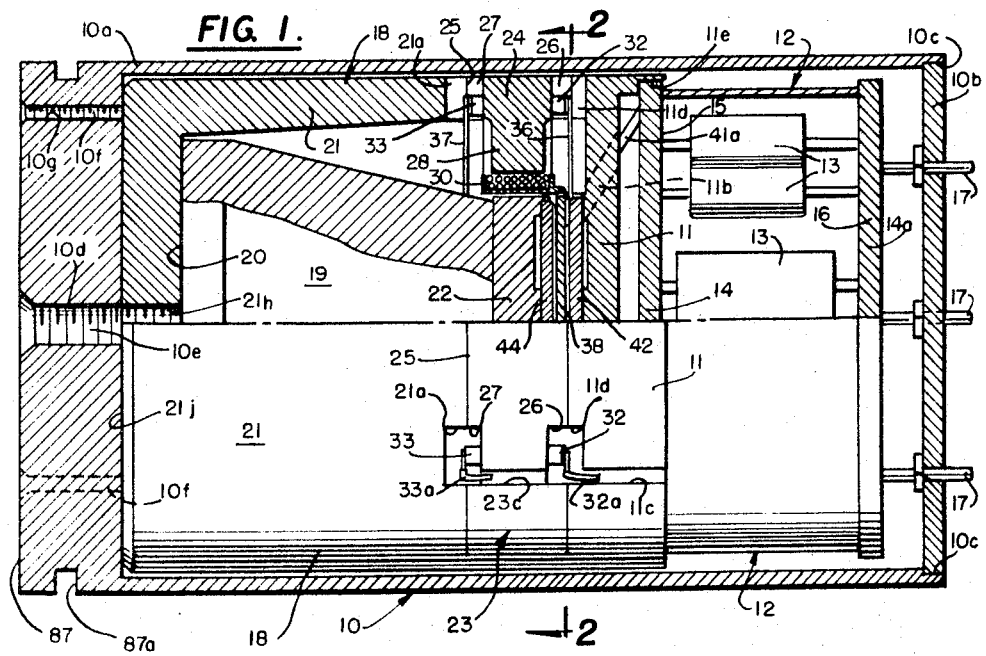
FIGURE 1 is an enlarged side elevational view, with a partial section, showing a complete accelerometer constructed in accordance with the present invention (and with a vertical section of the accelerometer casing)

Referring now to FIGURES 1 through 3B, like numerals of which refer to like parts throughout, the accelerometer of the present invention is generally indicated by the numeral 10, and both the mechanical and electrical components thereof are completely contained in a sealed cylindrical casing of relatively small size, comprising a main elongated cup-shaped section 10a and an end cap 10b which is press-fitted into flange recess 10c in the open end of main section 10a. It is noted the drawings presented are much enlarged, and have in certain instances been somewhat distorted for simplicity of description and ease of understanding. In practice, outside dimensions of accelerometer 10 and its casing are in the order of one inch in diameter and two inches in length.

With the casing of accelerometer 10 there is an annular internal partition 11 acting as a cap for the mechanical accelerometer sub-assembly and as a support for various components as described hereinafter, and dividing said accelerometer 10 into two sections 12 and 18, which respectively contain the electronic circuit portion and mechanical portions of the accelerometer 10. The electronic circuitry package of accelerometer section 12 includes a number of electrical components diagrammatically shown at 13 in FIGURE 1, which will be described in greater detail with reference to FIGURES 4 through 8. Said electronic components 13 are mounted between a circular support plate 14 adjacent the aforementioned partition cap 11, and another supporting plate 14a near casing cap 10b. Plates 14 and 14a comprise insulating materials having printed circuits thereon at 15 and 16, respectively, thereby to form the electrical circuits described hereinafter; and the over-all electrical circuit thus formed is coupled by solder lugs to glass-to-metal sealed terminals 17, mounted in end cap 10b of the sealed accelerometer casing.

As will appear hereinafter, no more than four such terminals 17 are actually required; i.e., a power input terminal, a signal output terminal, a signal ground terminal, and an instrument ground terminal. However, the number of said terminals may in fact be reduced to three by combining the ground terminals; e.g., by having the signal ground connected internally to the instrument ground. All of these various feaures of the electrical portion 12 of the accelerometer 10 will become more readily apparent subsequently.

The left-hand section 18 (as viewed in FIGURE 1) comprising the mechanical portion of the instrument contains, as amplified hereinafter, a single-ended magnet sub-assembly adapted to produce a relatively intense magnetic field across an annular air gap; an annular spool supporting a forcer coil (and, if desired, a zero-adjust or compensating coil), suspended in said air gap by means of the tangential wire suspension mentioned previously; and a differential capacitive pick-off structure formed by means of a movable, conductively coated quartz plate carried by the aforementioned spool and disposed between a pair of conductively coated quartz plates held in fixed position on portions of the magnet assembly and casing.

More specifically, the magnet assembly comprises a generally cylindrical or frusto-conical high flux Alnico-V permanent magnet 19 having its larger end 20 mounted within, and secured to the inside base of, a soft iron housing 21 of generally cup-shape, in good flux transfer engagement therewith, as by soldering or the like. The smaller end of magnet 19 supports a generally circular soft iron pole piece 22 (but, as will be apparent to those skilled in the art, such a separate pole piece 22 is optional, and the smaller end of magnet 19 can be shaped to assume the function of pole piece 22). The magnetic circuit further includes an annular soft iron ring 23 provided with an enlarged annular flange 24 having one side disposed in butt engagement with the outermost edges 25 of soft iron housing 21. Said flange 24 of ring 23 is provided with a plurality of recesses 26 on one of its sides (shown in FIGURE 2), and with additional like recesses 27 on its other side (see FIGURES 1, 2A and 3), for the mounting of the seismic mass suspension, as will be discussed. Ring 23 is further formed with an inwardly extending annular portion 28 which extends toward, but is spaced from, pole piece 22 thereby to define an airgap 29 therebetween (see especially FIGURE 3). [It is noted that the terms "ring-shaped" and "annular" may include closed configurations that are not strictly circular.]

For purposes of clarity, the dimensional relationships of the parts thus far described have, as already mentioned, been much exaggerated and in some cases distorted. In practice, air gap 29 is actually in the order of .040" in radial dimension and .090" in axial dimension, with the dimensions and shape of magnet 19 being selected so as to obtain a field strength in the order of 10,000 gauss across air gap 29. It will be appreciated, of course, that this intense field is obtained primarily through use of the magnet 19, with a closed magnetic circuit existing between said magnet 19, soft iron housing 21, pole rings 23, 28, gap 29, and pole piece 22. If it is desired to increase the magnetic field in air gap 29 even further, soft iron housing 21 can be partially or completely fabricated of a permanent magnetic material instead of soft iron. However, this arrangement is not ordinarily recommended since it involves a strong increase of stray magnetic fields; and the use of the magnet 19 in conjunction with the other soft iron parts acting as return paths, has been found to effect an entirely adequate field across the relatively small air gap 29.

The seismic element comprises a relatively light aluminum frame or spool 30 having side flanges providing an annular recess on its external surface in which is wound coil means comprising the forcer coil 31 mentioned previously, and if desired, a compensating or zero-adjustment coil 31a. Said spool 30 and its associated windings are held within air gap 29 by means of a novel suspension arranged to permit significant deflections and near ideal freedom of movement of the seismic element in an axial direction, i.e., along the sensitive axis of the instrument, but with high constraint against deflection in a radial or other direction. This novel suspension also provides electrically conductive leads to the forcer and compensating coils 31 and 31a, as well as to part of of the capacitive pick-off, from portions of the electronic assembly, as will be described.

The suspension comprises six wires 36 and 37 (see FIGURES 2 and 3), three of which wires are located on each side of spool or frame 30. Each such wire 36 and 37 of the suspension cam comprise a straight wire of circular cross-section. However, flattened wires with a width to thickness ratio of two or three are recommended, since they provide the suspension with greater flexibility. Wires 36 and 37 are each mounted at opposite ends on opposite sides of enlarged section 24 of ring 23 and spool 30, with the wires extending generally tangentially to said spool or frame 30.

In particular, enlarged section 24 of ring 23 is provided with three recesses 26 on one side of ring 23, and three recesses 27 on the other side thereof, spaced substantially 120° from one another. A glass block 32 is mounted within each of the several recesses 26 on one side of pole ring 23, with similar such glass blocks 33 being mounted within each of the several recesses 27. Similar glass blocks 34 and 35 are disposed on the opposing annular flange sides of spool 30, at 120° intervals, as will be apparent from FIGURES 1–3. Each of the several glass blocks 32, 33, 34 and 35 includes an outer conductive coating. Each of the three suspension wires 36 extends between appropriate pairs of said glass blocks 32 and 34, with the ends of said wires being connected to the conductive surfaces on said blocks 32 and 34, as shown especially in FIGURE 2. The wires 37 similarly extend on the other side of ring 23 and spool 30 between pairs of blocks 33 and 35, with their ends connected to the conductive surfaces of said blocks.

In the particular embodiment shown and thus far described, the six suspension wires 36 and 37 are located so that there are three at each end of the frame or spool 30. Detailed geometrical analysis shows, however, that five wires actually suffice to effect rigid radial constraint of the seismic element frame 30, with three such wires being disposed on one end of frame 30 and two wires on the other end thereof. However, six wires are considered advantageous for reasons of symmetry. Similarly, a larger number of tangential wires, e.g., eight or twelve, etc., can be employed, but such an arrangement does not bring any significant additional advantages to the suspension and its flexibility. Thus, in practice, six suspension wires are preferably used.

The described wire suspension of tangentially arranged wires 36 and 37 permits deflection of the seismic spool 30 in an axial direction while providing excellent restraint against displacement of spool 30 in a radial direction, whereby seismic mass 30 experiences a strictly linear displacement along the sensitive axis of the instrument. The described tangential disposition of the wires supporting the seismic element 30 avoids various disadvantages exhibited by radial wire suspensions suggested in prior accelerometers. For example, radial wires must stretch appreciably to allow for any large axial displacement of the seismic element, but, in practice, metal wires do not stretch sufficiently to permit a desired relatively free axial displacement of the seismic element, thereby giving rise to disadvantages already mentioned. The tangential wire suspension characteristic of the present invention, however, permits the wires 36 and 37 to bend (rather than requiring that they stretch) when the seismic mass 30 is moved axially due to inertial force, thus causing the seismic mass 30 to perform a slight "screw-driver" motion during axial deflection, whereby relatively large axial deflection can be readily effected without stretching the supporting wires 36 and 37. Thus, the improved suspension of the present invention provides maximum flexibility in the axial direction while simultaneously effecting desired high rigidity against displacement in a radial direction. This achieves, in a relatively simple and small sub-assembly, a suspension of high performance comparable to that obtained previously only with air bearings or flotation in large, expensive, high precision accelerometers. In fact, this tangential wire suspension for the seismic element 30 is superior to flotation or pendulous suspensions suggested heretofore, because flotation suspensions raise problems of drift due to thermal current; while pendulous suspensions inherently suffer from cross-coupling under acceleration loads since the pendulous mass does not defect along a straight path but rather along a curve. The tangential wire suspension solves all of these problems, since the inertial or seismic element 30 is not moved pendulously, but is instead suspended as it is through a system of tangential flexure arms, so that it experiences a strictly linear displacement along the sensitive axis of the instrument as described. Furthermore, the suspension is perfectly symmetrical along the sensitive axis of the instrument, thus minimizing problems of null shift due to unsymmetrical expansion under temperature changes, so that the over-all instrument exhibits extremely good zero stability.

The various tangential flexure or suspension arms 36 and 37 mounted on conductively coated glass insulators 32, 34, 33, 35 also provide paths for electrical signals to and from the seismic or mass element 30, thereby eliminating the need for separate flex leads to thus avoid a host of problems associated with such separate flex leads (e.g., resonance under vibration, temperature drift, etc.). Moreover, the arrangement utilizing flexure wires mounted on insulated pads or blocks at both ends thereof, eliminates the need for usual "gold leafs" conventionally employed in accelerometers, which prior construction involves difficult assembly and contributes to the temperature drift and vibration failure problems mentioned previously.

Movement of seismic spool 30 and its associated forcer coil 31 responsive to a resultant acceleration force imposed thereon with a vector along the main or sensitive axis of the instrument 10 is detected to provide an output signal and a restoring force to the seismic element 30, by means of a capacitive pick-off comprising a capacitor plate movable with spool 30 between a pair of fixed capacitor plates. More particularly, one end of aluminum frame or spool 30 extends beyond the magnetic circuit air gap 29 (on the right in FIGURES 1 and 3) and carries a movable capacitor plate 38 comprising a substantially circular plate or disc of fused quartz or other insulating material having its outer edge secured to frame 30 by a bezel 30a. (The resulting configuration of the seismic element 30 with attached capacitor plate 38 is accordingly cup-like, with said cup-shaped seismic element being inserted into the cup-shaped magnet assembly in opposed coaxial relation thereto.) The quartz disc 38 has its opposite sides metallized as at 39 and 40, thus providing two movable capacitor plates which form part of the differential capacitive pick-off of the accelerometer, designated by like numerals in the various electrical circuits of FIGURES 4 through 8, inclusive, for purposes of relating said electrical circuits to the physical embodiment of the invention shown in FIGURE 3.

[It is noted that in a modification amplified below, the movable capacitor plates 38, 39, 40 can be replaced by a single metal plate, which could be made a part of the coil frame or spool 30, with connection to, or insulation from ground, depending upon the particular circuit embodiment in which it is employed.]

The movable conductive capacitor plates 39 and 40 are disposed between a pair of fixed capacitor plates, one of which comprises a conductive coating 41 on a fused quartz or like disc 42 secured to cap or partition 11 by an annular bezel 11a formed on one side of cap 11. The other such fixed capacitor plate comprises a conductive coating 43 on another quartz or like disc 44 secured to the end of magnet pole piece 22 by an annular bezel 22a, with the outer end of pole piece 22 preferably having an annular recess 45. The resulting fixed capacitor plates provided by conductive coatings 41 and 43 are also designated by like numerals in the various electrical circuit diagrams of FIGURES 4 through 8 to interrelate the depicted electrical and mechanical components.

It will be appreciated that, by reason of the described arrangement, movement of seismic spool or frame 30 tends to effect like movement of its associated quartz plate or disc 38 and the conductive coatings 39 and 40 carried by the latter, thus providing a pair of variable capacitors. Upon movement of spool 30 and its associated movable capacitor plates 39 and 40, the capacitive gap constituting one of the variable capacitors will decrease while the gap constituting the other capacitor will increase. The relative increase and decrease of the two gaps will depend, of course, upon the direction and magnitude of applied resultant acceleration force. In any event, such movement can be utilized in conjunction with a bridge circuit to effect unbalance of the bridge circuit thereby to detect the amount of movement of the seismic mass 30 so as to provide the desired output signal and restoring force as below explained.

It is noted that the actual spacing between coatings 39 and 41 and between coatings 40 and 43, comprising the differential capacitive pick-off of the disclosed invention, are extremely small; e.g., in the order of $\frac{1}{1000}$ inch. Also, displacement of the movable capacitor plates 38, 39, 40 from its zero position is extremely slight, due to the extreme sensitivity of the instrument which responds to even very slight movements to effect a restoring force upon spool 30 through forcer coil 31.

It is also noted that the periphery of each of metallized fixed and movable capacitor plates 43, 40, 39 and 41 is suitably spaced from the respective capacitor plate retaining means (bezel 22a, seismic frame 30 and its bezel 30a, and bezel 11a, respectively), so that each of said capacitor plates 43, 40, 39 and 41 is electrically insulated from adjacent metal parts of the mechanical subassembly 18 by a peripheral portion of the respective quartz plate 44, 38 or 42 to which the metallized capacitor surfaces 43, 40, 39 and 41 is applied as above discussed.

Figure 3A:
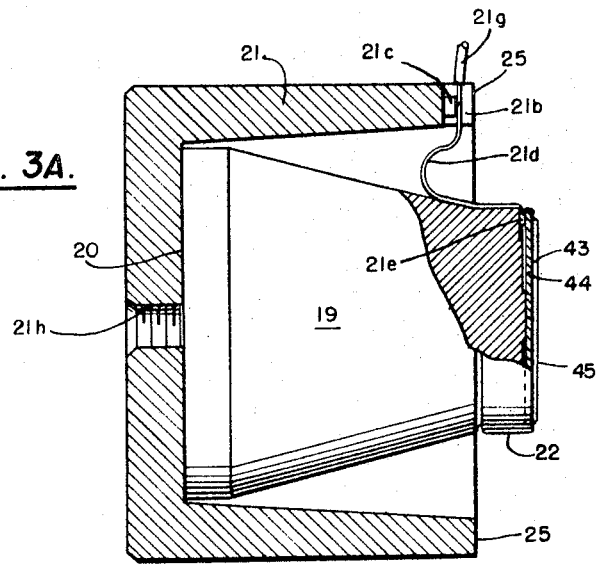
FIGURE 3A is a side elevation, with partial cross-section, showing the magnetic sub-assembly and one fixed capacitor pick-off plate of the accelerometer of FIGURE 1 (lines 3—3 and 3A—3A in FIGURE 2 show the location of the sections of FIGURES 3 and 3A, respectively)
Figure 3:
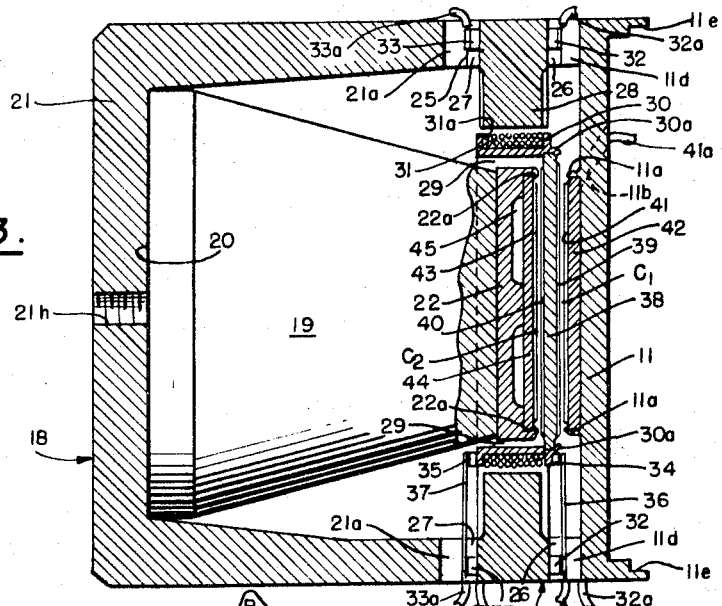
FIGURE 3 is an enlarged detail view, in partial cross-section, along line 3—3 in FIGURE 2, particularly showing the capacitive pick-off and related mechanical components of the accelerometer shown in FIGURE 1.

Three wire leads 32a are suitably connected to the outer conductive surfaces of insulated blocks 32 disposed in recesses 26 of enlarged rim 24 of the pole and suspension ring 23 (as shown particularly in FIGURES 3 and 2). Hence, leads 32a are electrically connected through suspension wires 36 to the outer conductive surfaces of insulated blocks 34 mounted on one side of inertial element and forcer coil spool 30. Three wires 33a are likewise suitably connected to the outer conductive surfaces of insulated blocks 33 in the recesses 27 on the opposite side of enlarged rim 24 of pole and suspension ring 23, in like manner as lead wires 32a (as illustrated in FIGURES 1 to 3A). Thus, lead wires 33a are electrically connected through suspension wires 37 to the outer conductive surfaces of insulated blocks 35 mounted on the opposite side of the inertial coil spool 30.

The outer conductive surface of one of insulated blocks 34 is electrically connected to the metallized capacitor plate 39 of movable quartz plate 38 in suitable manner. For example, referring to FIGURE 2, the bezel 30a of the inertial coil spool 30 may be notched at 30b adjacent the conductively coated insulated blocks 34; and a strip of conductive coating material may be provided on the edge of quartz disc 38 between one insulating block 34 and the conductive coating 39 on the outer side of the disc 38, as indicated at 34a in FIGURE 2. Thus, the movable capacitance plate 39 can be connected in the accelerometer control circuitry through associated suspension wires 36 and the lead 32a (as hereinafter more fully described with reference to FIGURES 4-8). The inner metallized movable capacitance surface 40 is also connected to the outer conductive surface of one of the insulated blocks 33 or 34 by suitable means. A preferred way of doing this is to provide the movable quartz plate 38 with a notch 38a in the peripheral edge thereof adjacent another one of the insulated blocks 34, and to provide a strip of conductive coating material (not shown) extending from the conductive surface of this insulating block 34 through said notch in the side of the quartz plate 38 to the conductive side 40 of the inner movable capacitance plate 38. Said conductive strip is suitably insulated from the outer metallized movable capacitance plate 39, as by omitting a portion of the metallized coating 39 in the region of said peripheral notch in quartz plate 38 and said conductive strip connecting the conductive surface of insulated block 34 to inner conductive capacitor surface 40. Thus, the movable capacitance plate 40 can also be connected in the control circuitry through one of suspension wires 36 and leads 32a (as hereinafter more fully described with reference to the electrical diagrams of FIGURES 4 through 8).

The ends of the forcer coil 31 are extended through holes or notches in one or both flange sides of the inertial element and coil frame 30 (not shown in the drawings); and these coil ends are connected to the outer conductive surfaces of two of the six blocks 34 and 35 on spool 30, thus enabling the forcer coil 31 to be connected in the accelerometer control circuitry (as amplified below with reference to FIGURES 4 through 8) through suspension arms 36 and/or 37 and leads 32a and/or 33a. If a compensating coil 31a is used, as in the preferred embodiment of the present invention, for functional purposes amplified with reference to FIGURE 8 below, the ends of the compensating coil 31a are likewise extended through holes or notches in one or both sides of inertial frame spool 30 (not shown in the drawings); and these coil ends are connected to outer conductive surfaces of two of the insulated blocks 34 or 35 on spool 30, thus enabling the compensating coil 31a to be connected in the control circuitry through suspension arms 36 and/or 37 and leads 32a and/or 33a (as amplified below with reference to FIGURE 8). [It is noted that if two of blocks 34 are used for connecting leads 32a to the movable capacitance plates 39 and 40 as described above, then the end of one of forcer or compensating coils 31 or 31a is extended through a notch or aperture in the side of coil frame 30 shown in FIGURE 2 and connected to the conductive surface of one of blocks 34, with the other end of this particular coil and the two ends of the other coil on the spool 30 being connected to the conductive surfaces of insulated blocks 33 on the opposite side of the coil frame 30 as above explained.]

The six suspension wires 36 and 37 for the seismic mass 30 are thus used as part of the accelerometer control circuitry including the forcer coil 31, compensating coil 31a, and movable capacitance plates 39 and 40, with important advantages discussed elsewhere in this application.

The partition or cap member 11 is also provided with an aperture, shown in dotted line at 11b in FIGURES 1 and 3, whereby another lead 41a may be suitably connected to the edge of the metallized capacitor surface 41 of fixed quartz plate 42, with a notch (not shown) being provided in the quartz plate retaining bezel 11a adjacent the inside end of aperture 11b so that the end of lead 41a may be connected to the conductive capacitor surface 41 while being insulated from partition or cap member 11 by a portion of the nonconductive quartz plate 42.

Referring to FIGURES 1 to 3B, and especially 3A and 3B, the peripheral edge of cup-shaped magnetic housing 21 is provided with three notches 21a, each disposed opposite one of notches 27 in the adjacent side of ringshaped pole piece 22, plus another notch 21b disposed opposite notch 27a in pole piece 22. There is mounted in notch 21b an insulated block 21c having an electrically conductive surface. A wire 21d is secured at one end to the outer conductive surface of insulated block 21c, and extends along the surface of the magnetic core 19 into a small axially extending notch 21e in the periphery of magnetic pole piece 22. The latter end of this wire 21d is connected to the electrically conductive capacitor plate 43 on the fixed quartz plate 44, with a notch 21f being provided in bezel 22a which retains quartz plate 44 on the end of the pole piece 22, so that the end of wire 21d is insulated from the magnetic pole piece 22. A wire lead 21g is also connected to the conductive surface of insulated block 21c in recess 21b, whereby the fixed capacitor plate 43 may be connected in the control circuitry through wire 21d and lead 21g (as discussed below with reference to FIGURES 4-8).

The lead wires 32a, 33a, 41a and 21g used to interconnect the above-described seismic mechanical assembly 18 to the below-described control circuitry of electronic package 12 are suitably extended to package 12 along the outside of mechanical sub-assembly 18 in a slight clearance provided between the outer walls of assembly 18 and the inner wall of main accelerometer casing section 10a (which clearance is illustrated with some exaggeration in FIGURE 1). Also ring 23 and annular cap member 11 may be provided with axially extending notches 23c and 11c, respectively, to accommodate leads 32a, 33a and 21g. (It is noted that annular cap member is provided with edge recesses 11d cooperating with recesses 26 of ring 23.)

The above-described magnet and fixed capacitor sub-assembly, magnetic pole ring and seismic element sub-assembly with movable capacitor plates, and end cap and sub-assembly with fixed capacitance plate are assembled in proper coaxial relationship and secured to each other by soldering, welding or the like, to complete the accelerometer's mechanical assembly 18. If desired, the outer edge of the cup-shaped magnet housing 21 can be provided with a small peripheral flange concentric with the longitudinal axis of housing 21 and magnet 19, 22; the annular partition plate or cap 11 can also be provided with a similar small peripheral flanges concentric with its central axis; and opposite peripheral edges of the enlarged section 24 of ring-shaped pole piece 23 can be provided with 90° recessed shoulders adapted to receive the aforementioned peripheral flanges of magnet housing 21 and cap 11, respectively, to thus facilitate true coaxial assembly of the involved sub-assemblies. Also, a suitable press fit may be provided between the corresponding shoulders and flanges of the three mentioned sub-assemblies so that they could be secured to each other by a press fit without the need of any other securing means. The outer side of partition or cap member 11 is also provided with a peripheral flange 11e which provides a 90° recessed shoulder for seating the adjacent end supporting plate 14 of the electrical package 12, which is secured to mechanical assembly 18 by suitable means, as a press fit and/or adhesive between plate 14 and cap 11.

Referring to FIGURE 1, the main casing 10a is secured to the base of magnet housing 21 by a screw 10e extending through an aperture 10d in the end of casing portion 10a and received in a threaded aperture 21h in the end of magnet housing 21. Three small jack screws 10f are provided at 120° circularly spaced intervals around screw 10e in apertures 10g in the end of casing 10a, with the ends of screws 10f abutting against the end 21j of magnet housing 21. Jack screws 10f are adjusted so as to tilt the accelerometer with respect to accurately machined flat base 87 of casing 10a, so that the axis of the accelerometer is precisely perpendicular to base surface 87, which can therefore be used as a mounting reference surface. Screw 10e may bend slightly under the action of the jack screws 10f to permit such adjustment. A suitable adhesive is provided between the inside base of casing 10a and the magnet sub-assembly 18 to retain the latter in the former, in conjunction with screw 10e.

The electrical portion of the accelerometer and its interrelation with the described mechanical portions thereof will best be appreciated by reference to FIGURES 4 through 8. In general, the over-all circuit, in its basic form, consists of an oscillator (e.g., a multivibrator) feeding the differential capacitive pick-off; and a differential amplitude detector which receives the two pick-off outputs, rectifies, and compares them. The output from the detector is then fed to the forcer coil, as well as to an output terminal from the instrument inasmuch as the current in the forcer coil actually represents the output signal of the instrument. The complete servo loop consisting of pick-off, amplitude detector, and forcer coil tied back to the pick-off, does not contain any electronic amplification and consists of passive elements only. The use of such a purely passive electronic circuit in the servo loop achieves significant advantages in improved reliability, as well as greatly improved stability through the exclusive use of drift-free passive components, and further facilitates the reduction in size and price achieved with the instrument of the present invention.

Figure 4:
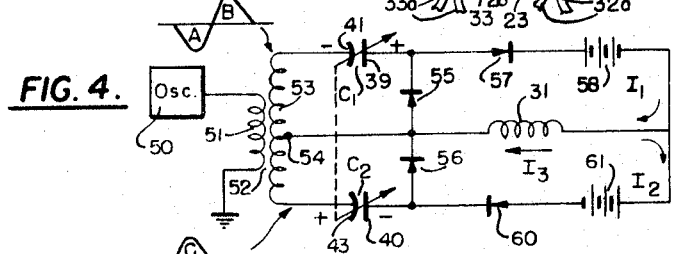
FIGURE 4 is a schematic diagram of an equivalent circuit illustrating the operation of one form of the present invention.

Reference is first made to FIGURE 4, which depicts an equivalent circuit for a mechanical and electrical arrangement constructed in accordance with the present invention. Energization for the system may be obtained from an oscillator 50 (for example, a multivibrator) operating at a relatively high frequency such as five to ten mc., thereby to pass relatively large power through the pick-off. Oscillator 50 is, as shown in FIGURE 4, coupled to the primary winding 51 of a transformer 52. The secondary 53 of said transformer is center tapped at 54, and has the two transformer sections thus formed connected respectively via diodes 55 and 56 to the displacement detector or pick-off comprising variable capacitors $C_1$ and $C_2$. Capacitor $C_1$ is, as illustrated, formed of conductive coatings 39 and 41 already described, whereas capacitor $C_2$ is formed of conductive coatings 40 and 43, described; and it will be appreciated that movement of the seismic element 30 effects an increase in the size of one of said capacitors $C_1$ or $C_2$, and a concurrent decrease in the size of the other capacitor. The junction of capacitor $C_1$ and rectifier diode 55 is coupled via a further rectifier diode 57 and a voltage source 58 to one end of forcer coil 31; and the junction of capacitor $C_2$ and rectifier diode 56 is similarly coupled via a further rectifier diode 60 and a voltage source 61 to said forcer coil 31.

The operation of the circuit shown in FIGURE 4 is as follows: Let us initially assume that oscillator 50 produces a substantially sinusoidal output resulting, by reason of the transformer secondary push-pull arrangement, in a waveform having sections A and B at the upper end of secondary winding 53, and a 180 degree out of phase waveform having sections C and D at the lower end of said secondary 53. [It will be appreciated, of course, that other voltage waveforms, such as a squarewave, sawtooth, etc., may be used in place of the sine wave source ilustrated.] During the portion of the waveform shown as A on the upper portion of secondary winding 53, capacitor $C_1$ will tend to charge through diode 55 to a value equal to the peak of the voltage applied; and the polarity of this charge will be as shown in capacitor $C_1$. Simultaneously, during the portion of the waveform shown as C, capacitor $C_2$ will charge to an equal but opposite value of voltage through diode 56. Although the voltages on both capacitors $C_1$ and $C_2$ are equal, said capacitors may contain different charges since their respective values of capacitance may be different, i.e., accumulated charge=volts times capacity.

During the next half cycle, shown as B at the upper end of winding 53 and as D at the lower end of secondary 53, current flows from $C_1$ through diode 57 and thence through the opposing voltage source 58 to forcer coil 31. Simultaneously, current flows from $C_2$ through diode 60 and through opposing voltage source 61 to said forcer coil 31. These two currents have been depicted in FIGURE 4 as $I_1$ and $I_2$, providing a resultant current $I_3$ through coil 31. The currents $I_1$ and $I_2$ are, of course, proportional to the charge previously stored in capacitors $C_1$ and $C_2$, and if the charge contained in both of these capacitors is equal, the two currents $I_1$ and $I_2$ will similarly be equal.

Currents $I_1$ and $I_2$ flow in opposite directions; and accordingly if the currents are equal in magnitude but of opposite polarity, the current shown as $I_3$ in FIGURE 4 will be zero. If, however, the capacitance of capacitor $C_1$ is larger than that of capacitor $C_2$, due to motion of the seismic element 30, then the magnitude of current $I_1$ and $I_2$ will be different, and there will be a net difference in current, producing a resultant current $I_3$ through forcer coil 31 tending to produce a force effecting motion of the seismic element 30 until capacitors $C_2$ and $C_1$ are equalized, i.e., until the seismic element 30 is restored to its zero position. By similar analogy, it will be appreciated that if the capacitance of capicator $C_2$ were larger than that of capacitor $C_1$, the resultant current $I_3$, effected through forcer coil 31, would flow in an opposite direction, thereby causing an opposite direction of motion of the seismic element 30. As a result of this operation, therefore, changes in the sizes of capacitors $C_1$ and $C_2$ effects a resultant current flow through the forcer coil 31 of a polarity and direction appropriate to restore the forcer coil 31 and therefore the seismic element 30 to its zero position; and the magnitude and polarity of the current thus flowing through the forcer coil 31 can be utilized as a measure of the magnitude and direction of applied acceleration forces.

The voltage sources 58 and 61 are necessary to prevent current $I_1$ from flowing through diodes 60 and 56, and similarly to prevent current $I_2$ from flowing through diodes 55 and 57. The magnitude of the voltage sources is determined by the maximum current desired in coil 31. When this voltage drop equals the magnitude of voltage sources 58 and 61, the current would tend to be shunted around forcer coil 31, and accordingly, the size of sources 58 and 61 can be determined and will depend upon the electrical characteristics of the forcer coil.

The particular voltage sources 58 and 61 depicted in FIGURE 4 have been shown as batteries. For practical operation, however, it may be desired not to employ batteries due to the maintenance problems involved, and due to possible difficulties which may result during aging of the batteries, as well as to potential variations which may occur due to current flow through said batteries.

Figure 5:
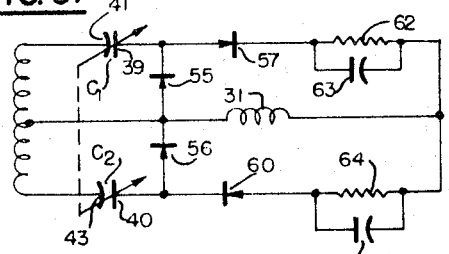
FIGURE 5 is a schematic diagram of a modified equivalent circuit which can be employed in the present invention.

An alternative arrangement is shown in FIGURE 5, and in this arrangement, RC networks are substituted for the batteries 58 and 61 to effect the desired voltage sources. In particular, a parallel resistance 62 and capacitance 63 may be employed in place of battery 58, and a similar such parallel resistance 64 and capacitor 65 may be employed in place of battery 61. This arrangement, while obviating the need for batteries, is not as efficient as the battery arrangement shown in FIGURE 4, since, for large differences between current $I_1$ and $I_2$, the value of voltage drops across resistors 62 and 64 will vary and will therefore prevent $I_3$ from having as large a value as possible. The over-all operation of the circuit shown in FIGURE 5 is otherwise the same as that already described in reference to FIGURE 4, as will be apparent to those skilled in the art in light of the disclosure herein, wherefore further description thereof will not be given.

Figure 6:
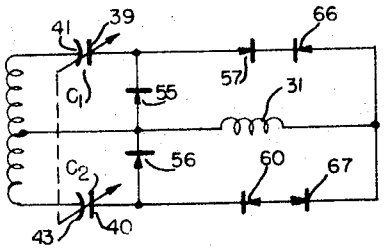
FIGURE 6 is a schematic diagram showing still another modified and preferred equivalent circuit such as may be employed in the present invention.

In order to obviate the disadvantages described in respect to the arrangement of FIGURES 4 and 5, an arrangement of the type shown in FIGURE 6 may be employed in which case Zener diodes 66 and 67 are used in place of the voltage sources 58 and 61 (FIGURE 4). This arrangement, which is more fully described below with reference to FIGURE 8, produces results like that of FIGURE 4, and is simple, small, and reliable in operation.

Figure 7:
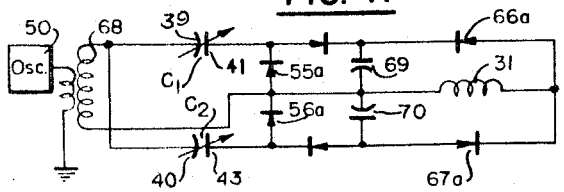
FIGURE 7 is a schematic diagram of still another equivalent circuit arrangement which can be used with the present invention.

FIGURE 7 shows a still further modification of the system generally similar to the Zener diode arrangement of FIGURE 6 and producing equivalent performance, but somewhat simpler in construction. In place of the center tapped winding utilized the embodiments of FIGURES 4 through 6, the arrangement of FIGURE 7 employs a single secondary winding 68 having one end thereof coupled to both of capacitors $C_1$ and $C_2$, as illustrated, to feed said capacitors. Since only a single phase is used for energizing capacitors $C_1$ and $C_2$, said capacitors charge through their respective diodes 55a and 56a on alternate half cycles of the applied voltage. Capacitors 69 and 70 are added to the circuit of FIGURE 6 to storage charges delivered by capacitors $C_1$ and $C_2$ so that a continuous current is delivered through Zener diodes 66a and 67a. This arrangement permits a simplification of the mechanical assembly, since one plate of the capacitors $C_1$ and $C_2$ may be electrically connected; i.e., the plates marked 39 and 40 in association with capacitors $C_1$ and $C_2$ may actually comprise the same electrical plate. Hence, the moving capacitor plate of the seismic element can be a single piece of metal formed, if desired, as a unitary portion of spool or frame 30, as described previously.

Figure 8:
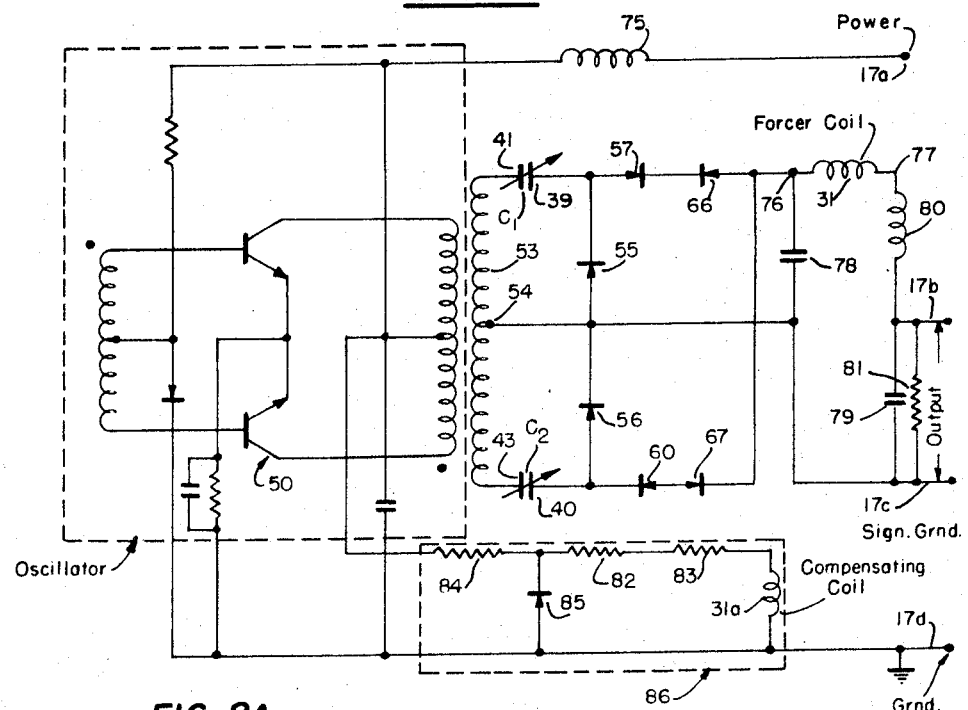
FIGURE 8 is a detailed schematic diagram of a preferred electrical circuit constructed in accordance with the present invention and corresponding to the equivalent circuit of FIGURE 6.

FIGURE 8 shows in somewhat greater detail a preferred circuit of the present invention constructed essentially in accordance with the equivalent circuit of FIGURE 6, discussed above, and operating in the manner already described with reference to FIGURE 4. (In order to relate the circuit of FIGURE 8 to those previously described, like numerals have been used.) Oscillator 50 has been segregated in the circuit of FIGURE 8 by a dotted block, and it is energized from a power source via a terminal 17a which is one of the terminals 17 mentioned previously with reference to FIGURE 1. A typical energization can be in the order of sixteen volts and 35 milliamperes, and the power thus supplied is coupled via inductance 75 to oscillator 50. Oscillator 50, as illustrated, comprises a transistorized multivibrator circuit of generally conventional form adapted to produce a push-pull output of relatively high frequency, e.g., one mc. or five to ten mc., desired, as mentioned previously. [Frequencies in this order of magnitude comprise, as is well known, a portion of the very high frequency (or VHF) band; and will be so designated, where pertinent, in the appended claims.]

The very high frequency output of oscillator 50 is, as already described, fed to the capacitors $C_1$ and $C_2$, and is in particular fed to the fixed plates 41 and 43. The outputs from the two metallize surfaces 39 and 40 of the moving plate 38 are then fed to diode rectifiers 55–57 and 56–60; and for purposes of effecting this coupling between the movable plates and said rectifiers, two of the suspension wires 36 and/or 37 are used as previously mentioned.

The various diode rectifiers, and their associated Zener diodes 66 and 67, operate in the manner already describe to effect current flow through forcer coil 31; and the opposing ends of the said forcer coil, designated in FIGURE 8 as 76 and 77, are also coupled to the other portions of the circuit by means of two more flexible wires 36–37 in the six wire seismic mass suspension as previously described. One end 77 of forcer coil 31 is further coupled to a second terminal 17b cooperating with a signal ground terminal 17c comprising two of the four output terminals from the unit of FIGURE 1, to provide signal outputs to some load. The output signal thus produced, as well as that flowing through the forcer coil 31, may be filtered by a filter network comprising capacitors 78 and 79, and inductance 80. A resistance 81 is preferably provided so that there is a voltage output across terminals 17b and 17c, which is proportional to acceleration imposed on the accelerometer 10 and its seismic element 30. A fourth terminal 17d may also be provided, but, as will be appreciated by those skilled in the art in light of this disclosure, terminals 17c and 17d may be combined.

The over-all arrangement may further include the previously-mentioned compensating coil 31a which is coupled to power source 50 via resistors 82, 83 and 84, and further associated with a Zener reference diode 85. Each of resistors 82 and 83 may be preselected so that the portion of the current in dotted block 86 effects a precise zero or null adjustment of the instrument, positioning the frame 30 and its associated forcer and compensating coils 31 and 31a at exact mechanical zero.

By way of illustration, components of the accelerometer servo loop circuit and null adjustment circuit shown in FIGURE 8 may typically have values approximately as follows:

| | | |
|---|---|---|
| Capacitors $C_1$ and $C_2$ | micromicrofarads | 5 to 250 |
| Forcer coil 31 | ohms | [1] 1000 |
| Capacitor 78 | microfarads | 0.005 |
| Capacitor 79 | do | 0.005 |
| Inductance (choke) 80 | microhenrys | 50 |
| Resistance 81 | ohms | 100 to 5000 |
| Zener diodes 66 and 67 | volts | 12 |
| Compensating coil 31a | ohms | [2] 100 |
| Resistances 82 and 83 | ohms | 200,000 |
| Resistance 84 | do | 2000 |
| Zener diode 85 | volts | 6 |

[1] 1000 turns.
[2] 100 turns.

Diodes 55, 56, 57 and 60 are high speed diodes like type 1N914. The value of resistor 81 is selected according to the particular g range of the accelerometer 10, depending on desired voltage output for the involved g range, since current sensitivity per g of accelerometer 10 is quite constant. The values of resistors 82, 83 and 84 are also selected according to desired accelerometer characteristics. The values of other elements of FIGURE 8 are not critical, and may be selected in accordance with desired characteristics, as will be apparent to those skilled in the art in light of the disclosure herein.

Because of the perfect symmetry of the over-all circuit, temperature effects on the null stability are extremely small. Any possible asymmetry of the square-wave or other cyclic output of the multivibrator or oscillator 50 (e.g., unbalance between "on" and "off" time) does not affect the balance between the two pick-off signals produced by capacitors $C_1$ and $C_2$ since the system output depends only on the magnitude of the voltage step and does not depend on the duration of the square-wave. In order to reduce to almost zero any error due to a change in the electrical characteristics of the several components (diodes, etc.) with temperature and aging, the servo loop is held extremely tight. The forcer coil 31 in particular requires a current of only 0.2 milliamperes to resist a one g acceleration load, and the pick-off plates 39 and 40 are deflected by as little as two microns per g. This is 1/1000 of the deflection which the inertial element 30 would experience under one g acceleration with an open servo loop, wherefore any change in the servo loop gain affects the sensitivity of the instrument by only 1/1000 of its value. A ten percent decrease in electrical gain for instance will decrease the output of the instrument for a certain g loading by only 0.01%. It should further be noted that the tight servo loop employed results in the instrument exhibiting a very high natural frequency, exceeding 1000 cycles/second. Therefore, the accelerometer will faithfully record fast acceleration changes without time lag or overshoot, and any tendency to resonate under severe vibrations is very much reduced.

It should be noted that servo instruments of types suggested heretofore, while employing sensing elements and forcer elements having functions similar to those of corresponding components of accelerometer 10 of the present invention, are ordinarily so arranged that the sensing element produces only a relatively small signal; and amplifiers are accordingly normally associated with the sensing element. Indeed, even in such an arrangement, the sensing element signal is ordinarily so small that it is difficult to recognize when mixed with stray signals from adjacent wires, noise generated in the amplifier, etc. To assure amplification of only the proper signal, therefore, prior systems have commonly employed phase detection wherein the sensing element is energized with a known phase of a particular frequency. The sensing element output, in these prior arrangements, will then normally be a signal having the same frequency as the excitation signal and having the same or an exactly opposite phase; and this signal is then amplified and passed through a detector that only conducts when excited by a signal and a reference voltage of exactly the same or exactly opposite phase. Other or stray signals having different frequencies, or having the same frequency but a phase other than zero degrees or 180 degrees as compared to the reference voltage, will thus be attenuated.

The use of phase detection is generally incorporated in such prior servo accelerometer instruments since most such instruments require significant power to restore force balance; and this power, if passed directly through the position sensor, tends to produce undesired characteristics, such as opposing torques or forces, non-linearities, etc. Indeed, the significant power required to effect force balance, and the various resultant disadvantages mentioned, can in most cases ultimately be related back to the form of seismic mass actually employed, i.e., the relatively heavy masses conventionally employed heretofore in accelerometers have necessarily imposed various heavy power requirements upon the associated electrical circuitry to assure that force balance can be achieved.

The accelerometer of the present invention, however, avoids these various disadvantages and the relatively high power requirements characteristic of prior servo accelerometers, by using a very light-weight seismic element coupled to a light-weight position detector and associated with a high strength magnetic field made possible by the optimized magnetic circuit assembly described. As a result, very little current is required to prevent motion of the seismic mass even when that mass is subjected to accelerations many times the force of gravity. The total power required for forcing or restoring the seismic element passes directly through the capacitor plates which constitute the position sensor; and by so employing the capacitor plates as a portion of the forcer coil circuit, a significant simplification of the over-all circuit results.

To obtain adequate gain in the position sensor ("gain" being a measure of the milliamperes of output current derived from a given linear displacement), the capacity of the displacement sensor should be large, and the frequency of the exciting signal should be high. These factors are achieved in the present invention by the particular mechanical arrangement shown, in that the capacitive plates exhibit relatively large areas of conductive surface; and, in addition, the spacing between these plates is relatively small, approximately 0.001 inch, for increased sensitivity. The particular mechanical arrangement of accelerometer 10 shown at 18 thus has a direct bearing upon the circuit simplifications which can be achieved by the present invention. Moreover, the use of a high excitation frequency, necessary as mentioned previously to obtain adequate gain, is made possible by locating the amplitude detector in close proximity to the mechanical assembly. The use of large areas of capacitive plates with close spacing also provides damping of the moving assembly by the viscous shear of air contained between the moving and fixed plates.

It should be noted that there is an optimum value of the voltage which should be applied to the capacitor plates. Since a force is produced between two bodies having an electrical charge, the voltage applied to the plates cannot be increased indefinitely nor can the plates be moved too closely together to achieve greater gain of the displacement sensor and still achieve good linearity. However, if the voltage applied to the plates is varied (or, for a given voltage on the plates, if the distance between the plates is varied) to achieve a force just equal to the spring force provided by the several suspension wires, then the position of the seismic element may be varied through small distance and be essentially free of all restraining forces. In this region, the position sensor and the current through the forcer coil will therefore become a truer measure of the force acting on the seismic element.

Figure 8A:
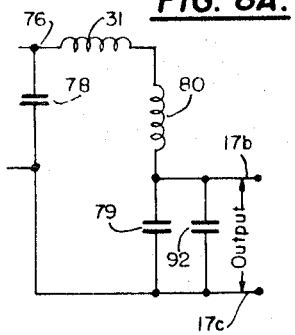
FIGURE 8A shows a modification of the schematic circuit of FIGURE 8 whereby the disclosed accelerometer is converted to a velocity indicator.

Because the accelerometer of the present invention requires such a small current per g by virtue of its novel mechanical construction and circuitry [e.g., 0.2 ma., or even smaller], the accelerometer 10 can be adapted with slight modification to indicate velocity. Referring to FIGURE 8A, this is achieved by substituting a relatively large capacitor 92 (e.g., 1 to 100 microfarads) across output terminals 17b and 17c in place of resistor 81 in the accelerometer circuit of FIGURE 8. This results in integration of the resultant current passing through forcer coil 31, which is proportional to acceleration imposed on seismic element 30, whereby the output across capacitor 92 is proportional to velocity.

While it is theoretically possible to integrate the output of prior accelerometers by similar use of a capacitance to get an output proportional to velocity, this is not practical with all but one or two known prior accelerometers because they require such a large current per g, usually in the order of 2 milliamperes for each g acceleration. This would require such a large size capacitor for velocity indication as to be impractical. Thus, the present invention also provides a new improved velocity indicator of simplified desgn, high performance, and small physical size.

Figure 8B:
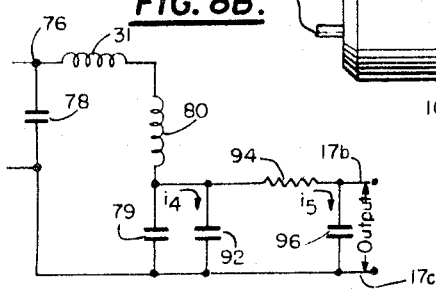
FIGURE 8B shows a further modification of the schematic circuit of FIGURE 8A whereby the disclosed accelerometer is usable as a velocity integrator to give a displacement indication.

Referring to FIGURE 8B, the velocity indicator arrangement described with reference to FIGURE 8A (and FIGURE 8) can also be further modified to integrate the velocity output across capacitor 92 and thus provide a voltage output proportional to displacement. To achieve this, there is added a high resistance 94 (e.g., 100,000 ohms), and a capacitor 96 having a relatively low value compared to that of capacitor 92 (e.g. one tenth, so when capacitor 92 is 100 microfarads capacitor 96 is 10 microfarads). These relative impedance values of 92, 94, 96 cause current $i5$ to be low compared to current $i4$ (in FIGURE 8B) for greater accuracy of the displacement indicating output across capacitor 96; however, the accuracy of displacement indication is better at high frequencies and decreases as frequency approaches D.C. Thus, the present invention also provides a new improved displacement indicator of small size.

It is noted that the described accelerometer 10 can be modified by use of a single pair of variable capacitor plates associated with the seismic element 30 (i.e., one variable capacitor $C_1$ or $C_2$ shown in FIGURE 3), with another fixed external capacitor being included in the electronic assembly 12 (FIGURE 1). In this event, one of the capacitors $C_1$ or $C_2$ in each of the circuits of FIGURES 4 to 8 would be a variable capacitor as shown in said figures, while the other capacitor $C_1$ or $C_2$ would be a fixed capacitor of suitable value; but otherwise the circuits of FIGURES 4–8 would be as shown. Also, in that event, either parts 44, 43, 40 or parts 39, 42, 41 would be omitted from the mechanical sub-assembly 18. Mode of operation of this modification would be similar to the described embodiments of FIGURES 3 and 4 to 8, since movement of the seismic element 30 will result in a difference of the value of the variable capacitor compared to the value of the fixed capacitor, by virtue of increase or decrease of the former in relation to the latter. This will produce a resultant current through the forcer coil 31 tending to produce a force effecting motion of the seismic element 30 until said variable and fixed capacitor are equalized (in a manner similar to that described above with reference to FIGURE 4). This modification would be somewhat cheaper to fabricate than that incorporating a pair of variable capacitors as in FIGURE 3. Also, this modification will function satisfactorily though not as well as the embodiment of FIGURES 3 and 4–8. In particular, this modification would suffer somewhat of a loss in loop gain and is likely to have some increased temperature sensitivity as compared to the embodiment of FIGURE 3.

Figure 9:
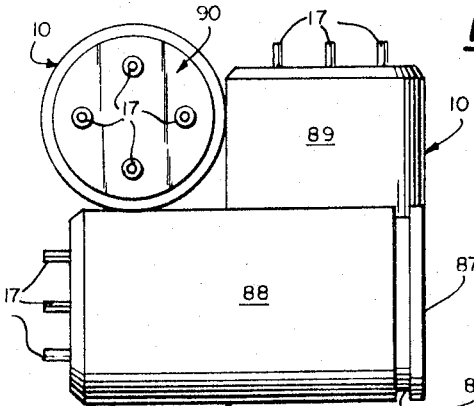
FIGURE 9 illustrates a three-axis package assembly utilizing the accelerometer of the present invention.

In use, the over-all accelerometer may be mounted in various ways. End 87 of casing 10a machined precisely flat, and adjusted perpendicular to the sensitive axis of the accelerometer as above explained, permits mounting of the accelerometer unit 10 on surface 87 with desired orientation, and the casing 10a is provided with an annular recess 87a adapted to receive a plurality of spaced mounting clips. Alternatively, the casing unit 10a may include a mounting flange adapted to receive suitable clamping blocks. The accelerometer 10 may by used singly to detect acceleration force vectors in particular desired direction; or, as shown in FIGURE 9, a plurality of such units can be used to measure acceleration forces in a plurality of directions. The particular arrangement of FIGURE 9 shows three units at 88, 89 and 90 mounted in mutually orthogonal directions to form a three-axis package capable of detecting resultant accelerations in three dimensions; and it will be appreciated that the outputs of three such packages may be vectorially combined to detect a resultant acceleration in any particular direction.

It will be apparent from the foregoing that the present invention provides a new improved linear accelerometer of the servo type, and simplified velocity and displacement indicators utilizing said accelerometer, which achieve the objects and advantages discussed earlier in this application.

While we have thus described preferred embodiments of the present invention, many variations will be suggested to those skilled in the art. It must therefore be understood that the foregoing description is meant to be illustrative only and should not be considered limitative of our invention; and all such variations and modifications, as are in accord with the principles described are meant to fall within the scope of the appended claims.

Having thus described our invention, we claim:

1. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least five wires secured to said inertial element and extending away from said inertial element in a substantially tangential direction relative to said coil, the other ends of said wires being secured to a fixed portion of said accelerometer, said wires all lying in planes transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element.

2. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer ciol, a magnetic assembly including a substantially circular magnetic pole piece projecting into said annular coil to a point adjacent said movable capacitor plate, a stationary capacitor plate carried by said pole piece and spaced from said movable plate, and suspension means including at least five wires secured to said inertial element and extending away from said inertial element, said wires extending tangential to a circle lying in a plane transverse to said axis and having said axis at its center, the distance from said axis to the point of attachment of said wires to said inertial element being substantially equal to the radius of said circle, the other ends of said wires being secured to a fixed portion of said accelerometer, said wires all lying in planes transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element.

3. The device of claim 2 wherein the radius of said circle is substantially equal to the radius of said annular forcer coil.

4. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least five wires secured to said inertial element and extending away from said inertial element in a substantially tangential direction relative to said coil, the other ends of said wires being secured to a fixed portion of said accelerometer, three of said wires lying in a first plane transverse to said axis of movement of said coil and the remaining two of said wires lying in a second plane transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element.

5. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least six wires secured to said inertial element and extending away from said inertial element, said wires extending tangential to a circle lying in a plane transverse to said axis and having said axis at its center, the distance from said axis to the point of attachment of said wires to said inertial element being substantially equal to the radius of said circle, the other ends of said wires being secured to a fixed portion of said accelerometer, three of said wires lying in a first plane transverse to said axis of movement of said coil and the remaining three of said wires lying in a second plane transverse to said axis of movement of said coil, at least three of said wires being connected to said inertial element at different angular locations relative to said axis, all of said wires extending away from said inertial element in a clockwise direction along said axis, at least four of said wires being of substantially equal length between their points of attachment to said fixed portion of the accelerometer and said inertial element.

6. The device of claim 5 wherein said wires form at least two pairs with the two wires of a pair lying in the same longitudinal plane parallel with said axis.

7. The device of claim 6 wherein said wires form three pairs with the two wires of a pair lying in the same longitudinal plane parallel with said axis.

8. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least six wires secured to said inertial element and extending away from said inertial element, said wires extending tangential to a circle lying in a plane transverse to said axis and having said axis as its center, the distance from said axis to the point of attachment of said wires to said inertial element being substantially equal to the radius of said circle, the other ends of said wires being secured to a fixed portion of said accelerometer, three of said wires lying in a first plane transverse to said axis of movement of said coil and the remaining three of said wires lying in a second plane transverse to said axis of movement of said coil, the said three wires in said first plane being connected to said inertial element in a clockwise direction looking in one direction along said axis, said wires forming three pairs with the two wires of a pair lying in the same longitudinal plane parallel with said axis, all six of said wires being of equal length between their points of attachment to said fixed portion of the accelerometer and said inertial element.

9. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least five wires secured to said inertial element and extending away from said inertial element in a substantially tangential direction relative to said coil, the other ends of said wires being secured to a fixed portion of said accelerometer, said wires being electrically conductive, some of said wires being electrically connected to said forcer coil for effecting current flow through said forcer coil via at least a portion of said suspension means, said wires all lying in planes transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element.

10. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least five wires secured to said inertial element and extending away from said inertial element, said wires being electrically conductive, some of said wires being electrically connected to said forcer coil for effecting a current flow through said forcer coil for effecting current flow through said forcer coil via at least a portion of said suspension means, said wires extending tangential to a circle lying in a plane transverse to said axis and having said axis as its center, the distance from said axis to the point of attachment of said wires to said inertial element being substantially equal to the radius of said circle, the other ends of said wires being secured to a fixed portion of said accelerometer, said wires all lying in planes transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element.

11. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least five wires secured to said inertial element and extending away from said inertial element in a substantially tangential direction relative to said coil, the other ends of said wires being secured to a fixed portion of said accelerometer, said wires all lying in planes transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element, and high-frequency signal generator means inductively coupled to said capacitor plates and thence through said forcer coil at an amplitude level determined by the position of said forcer coil in said magnetic field.

12. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least five wires secured to said inertial element and extending away from said inertial element, said wires being electrically conductive, some of said wires being electrically connected to said forcer coil for effecting current flow through said forcer coil via at least a portion of said suspension means, said wires extending tangential to a circle lying in a plane transverse to said axis and having said axis as its center, the distance from said axis to the point of attachment of said wires to said inertial element being substantially equal to the radius of said circle, the other ends of said wires being secured to a fixed portion of said accelerometer, said wires all lying in planes transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element, and high-frequency signal generator means coupled to said capacitor plates and to said forcer coil for effecting current flow through said capacitor plates and thence through said forcer coil at an amplitude level determined by the position of said forcer coil in said magnetic field.

13. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least five wires secured to said inertial element and extending away from said inertial element in a substantially tangential direction relative to said coil, the other ends of said wires being secured to a fixed portion of said accelerometer, said wires all lying in planes transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element, and an electronic control and output circuit comprising an oscillator coupled to said capacitor plates, said circuit also including an amplitude detector coupled to said capacitor plates for producing an output signal when said inertial element departs in position from a predetermined zero position, and means responsive to said output signal for restoring said inertial element to its predetermined zero position.

14. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least five wires secured to said inertial element and extending away from said inertial element, said wires extending tangential to a circle lying in a plane transverse to said axis and having said axis as its center, the distance from said axis to the point of attachment of said wires to said inertial element being substantially equal to the radius of said circle, the other ends of said wires being secured to a fixed portion of said accelerometer, said wires all lying in planes transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element, and an electronic control and output circuit comprising an oscillator coupled to said capacitor plates, said circuit also including an amplitude detector coupled to said capacitor plates, for producing an output signal when said inertial element departs in position from a predetermined zero position, and means responsive to said output signal for restoring said inertial element to its predetermined zero position.

15. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a capacitor plate secured adjacent its peripheral edge to said inertial element for movement with said forcer coil, a magnetic assembly including a substantially circular magnetic pole piece projecting into said annular coil to a point adjacent said movable capacitor plate, a stationary capacitor plate carried by said pole piece and spaced from said movable plate, and suspension means including at least six wires secured to said inertial element and extending away from said inertial element, said wires extending tangential to a circle lying in a plane transverse to said axis and having said axis as its center, the distance from said axis to the point of attachment of said wires to said inertial element being substantially equal to the radius of said circle, the other ends of said wires being secured to a fixed portion of said accelerometer, three of said wires lying in a first plane transverse to said axis of movement of said coil and the remaining three of said wires lying in a second plane transverse to said axis of movement of said coil, the said three wires in said first plane being connected to said inertial element at locations spaced 120° about said axis, all of said wires extending away from said inertial element in a clockwise direction looking in one direction along said axis, said wires forming three pairs with the two wires of a pair lying in the same longitudinal plane parallel with said axis, all six of said wires being of equal length between their points of attachment to said fixed portion of the accelerometer and said inertial element, a third capacitor plate on the side of said movable capacitor plate remoted from said stationary capacitor plate, oscillator means inductively coupled to said capacitor plates, differential amplitude detector means coupled to said capacitor plates and including a pair of oppositely poled diodes coupling said plates to one end of said forcer coil thereby to effect oppositely directed current flow from said oscillator through said coil via said capacitor plates and diodes whereby said oppositely directed current effects substantially zero resultant current in said coil when said movable plate is at a predetermined zero position relative to said stationary plate, and said oppositely directed current flows via said capacitor plates and diodes with a resultant current flow through said coil when said movable plate departs from said predetermined zero position relative to said stationary plate, said resultant current flow through said coil having a magnitude and direction related to the magnitude and direction of departure from zero position of said movable plate, and voltage reference means between said coil and each of said diodes.

16. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a magnetic assembly including a substantially circular magnetic pole piece projecting into said annular coil, a variable electrical impedance for sensing the movement of said inertial element, said variable impedance comprising a first movable electrical conductor carried by said inertial element and a second stationary electrical conductor adjacent to but spaced from said first electrical conductor, said impedance varying in accordance with the spacing between said two conductors, means for coupling said variable impedance to a source of electrical energy, means for deriving an electrical output from said variable impedance indicative of the movement of said inertial element, and suspension means including at least five wires secured to said inertial element and extending away from said inertial element in a substantially tangential direction relative to said coil, the other ends of said wires being secured to a fixed portion of said accelerometer, said wires all lying in planes transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element.

17. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a magnetic assembly including a substantially circular magnetic pole piece projecting into said annular coil, a variable electrical impedance for sensing the movement of said inertial element, said variable impedance comprising a first movable electrical conductor carried by said inertial element and a second stationary electrical conductor adjacent to but spaced from said first electrical conductor, said impedance varying in accordance with the spacing between said two conductors, means for coupling said variable impedance to a source of electrical energy, means for deriving an electrical output from said variable impedance indicative of the movement of said inertial element, and suspension means including at least five wires secured to said inertial element and extending away from said inertial element, said wires extending tangential to a circle lying in a plane transverse to said axis and having said axis as its center, the distance from said axis to the point of attachment of said wires to said inertial element being substantially equal to the radius of said circle, the other ends of said wires being secured to a fixed portion of said accelerometer, said wires all lying in planes transverse to said axis of movement of said coil, at least three of said wires being connected to said inertial element at different angular locations relative to said axis, all of said wires extending away from said inertial element in a clockwise direction looking in one direction along said axis, at least four of said wires being of substantially equal length between their points of attachment to said fixed portion of the accelerometer and said inertial element.

18. The device of claim 17 wherein the radius of said circle is substantially equal to the radius of said annular forcer coil and said movable electrical conductor comprises a conductive plate secured adjacent its peripheral edge to said inertial element.

19. In an accelerometer of the servo type wherein an inertial element comprising a coil moves in a magnetic field and is caused to be restored to a preselected position in said field by a signal generated as a result of said movement, the improvement which comprises an inertial element including an annular forcer coil movable along an axis in said field, a magnetic assembly including a substantially circular magnetic pole piece projecting into said annular coil, a variable electrical impedance for sensing the movement of said inertial element, said variable impedance comprising a first movable electrical conductor carried by said inertial element and a second stationary electrical conductor adjacent to but spaced from said first electrical conductor, said impedance varying in accordance with the spacing between said two conductors, means for coupling said variable impedance to a source of electrical energy, means for deriving an electrical output from said variable impedance indicative of the movement of said inertial element, and suspension means including at least six wires secured to said inertial element and extending away from said inertial element, said wires extending tangential to a circle lying in a plane transverse to said axis and having said axis as its center, the distance from said axis to the point of attachment of said wires to said inertial element being substantially equal to the radius of said circle, the other ends of said wires being secured to a fixed portion of said accelerometer, three of said wires lying in a first plane transverse to the axis of movement of said coil and the remaining three of said wires lying in a second plane transverse to said axis of movement of said coil.

20. The device of claim 19 wherein said wires form three pairs with the two wires of a pair lying in the same longitudinal plane parallel with said axis.

No references cited.

RICHARD C. QUEISSER, *Primary Examiner.*

J. J. GILL, *Assistant Examiner.*